United States Patent Office 3,019,168
Patented Jan. 30, 1962

3,019,168
HEAT AND ULTRA-VIOLET LIGHT ATTENUATION OF POLIO VIRUS
Alton R. Taylor, Grosse Pointe Park, Mich., assignor to Parke, Davis & Company, Detroit, Mich., a corporation of Michigan
No Drawing. Filed Feb. 20, 1956, Ser. No. 566,374
13 Claims. (Cl. 167—78)

This invention relates to vaccines, that is, substances capable of producing antigenic response in man and other mammals, and to methods for preparing the same from viruses capable of producing disease. More particularly, the invention relates to poliomyelitis vaccines and to methods for preparing the same from live poliomyelitis viruses.

Heretofore, poliomyelitis virus vaccine products have been prepared by inactivating poliomyelitis viruses by treatment with either formaldehyde or ultraviolet light. The purpose of such treatment is to render the virus non-infectious by killing it but at the same time not substantially destroying its inherent antigenic property, that is, the property of the virus to cause the production of antibodies when introduced into the blood or tissue of man and other mammals. One of the difficulties with the known formaldehyde method of killing poliomyelitis viruses is that there is a relatively narrow range of safety between the concentration of formaldehyde necessary to kill the virus and the concentration which destroys the antigenic property of the virus. The formaldehyde method has also been reported to produce varying results and in some instances incomplete killing of the virus. Likewise, the method employing ultraviolet irradiation alone produces varying results in that it either fails to satisfactorily kill all of the virus or tends to destroy the antigenic property of the virus. Thus, if irradiation is employed to the extent required for a complete kill of the virus, the antigenicity is essentially totally destroyed.

In view of the foregoing there is a need at the present time for a generally applicable process for producing polio virus products which possess a high degree of antigenicity, are free of living virus and are suitable for use in immunizing against infection by live poliomyelitis virus.

One of the objects of the present invention is to provide a safe and effective method of killing living poliomyelitis viruses with less destruction of the antigenic property of the viruses than is normally encountered in the presently known processes.

Another object of the invention is to provide a method of producing poliomyelitis virus products which are free of toxic agents, possess a high degree of antigenicity and are suitable for immunization against infection by live poliomyelitis virus.

Other objects and advantages of the invention will be apparent by reference to the specification which follows:

In accordance with the invention the above objects are realized by subjecting an aqueous medium containing living poliomyelitis virus to treatment with a combination of ultraviolet irradiation and head and/or heat and formaldehyde under such conditions that the first killing treatment of the combination is sufficient to kill a high proportion but not all of the living poliomyelitis virus present in the original aqueous medium and that the subsequent killing treatment or treatments of the combination is sufficient to kill all the residual living poliomyelitis virus present in the medium, none of the said killing treatments if individually applied to the original aqueous medium being capable of completely killing all the living poliomyelitis virus present in said medium. The vaccine product obtained by this method is not only free from living poliomyelitis virus but also possesses a higher degree of antigenicity than that obtained by known methods. This result is highly unexpected because the known methods which employ either ultraviolet irradiation or heat alone produce almost complete loss of antigenicity when used to the extent required for complete killing of the virus. The present vaccine in addition to possessing a higher degree of antigenicity than a comparable formaldehyde killed vaccine has the added advantage that the killed poliomyelitis virus present in the vaccine shows no tendency to re-activate upon storage.

The order in which the killing treatments of the combination are employed is not particularly critical and does not, so far as it has been possible to determine, have any material effect upon the results obtained. For example, one may first subject the aqueous medium containing the living poliomyelitis virus to the action of ultraviolet irradiation and then heat or one may first subject the medium to the action of formaldehyde and heat and then to ultraviolet irradiation. One may also first subject the medium to the action of formaldehyde and heat, then to ultraviolet irradiation and finally to heat alone. If desired, one may first subject the medium to the action of ultraviolet irradiation and then to the action of heat and formaldehyde.

The invention is applicable broadly to poliomyelitis virus and can be used on the viruses either single or in combination. The most commonly employed poliomyelitis viruses are those of Types 1, 2 and 3 and, in general, each virus type is treated separately and the resulting vaccine combined later with the vaccine or vaccines prepared from the other type or types.

The aqueous medium containing the living poliomyelitis virus which is used as the starting material of the process is a solid-free aqueous medium in which the poliomyelitis virus is capable of existing but incapable of growth which contains live poliomyelitis virus. It can be an aqueous extract of a suspension of tissue on which the poliomyelitis virus has been propagated. A suitable aqueous medium is a tissue culture fluid from, for instance, "199" tissue culture medium, infected with poliomyelitis virus. One example of such a tissue culture fluid is that obtained by filtration of a monkey kidney tissue culture of poliomyelitis virus prepared as described by Dulbecco et al. in the Journal of Experimental Medicine, volume 99, page 167 (1954). In accordance with this method, macerated monkey kidney tissues are trypsinized to remove extraneous tissue, the residual cells allowed to multiply, the media inoculated with poliomyelitis virus, the mixture incubated, and the fluid harvested. While this method is preferred, the trypsinization step can be omitted, if desired. In this latter instance, however, the protein content of the vaccine may be excessively high and should be assayed before use in order to avoid the production of vaccines which may produce protein reactions. In the preparation of mixed vaccines, that is, vaccines containing more than one type of poliomyelitis virus, it is permissible to pool or mix the harvested fluids containing the various types prior to carrying out the process of the invention but, as indicated above, it is generally preferable to pool or mix the individual vaccines after carrying out the process. For practical purposes, in the interest of employing a virus starting material possessing high antigenicity the infectivity titer of the aqueous medium should be of high order, that is, at least $10^{-5}$. Generally speaking, a medium having an infectivity titer in the range of $10^{-5}$ or higher is employed. Under normal conditions of storage, the aqueous medium is kept under refrigeration, for example, at a temperature in the range of −5° to 10° C. When handled further, in accordance with the invention, the medium becomes warmer, depending on the temperature conditions employed during processing. The aqueous medium containing the living poliomyelitis virus is, in general, produced under aseptic conditions and is bacteriologically sterile. However, in general practice bacterial sterility is insured by subjecting the medium to a bacterial filtration prior to use in the process. Additionally one may concentrate and/or partially purify the living virus and employ such suspensions or solutions as starting materials for the process. For convenience, such suspensions or solutions will be understood to be included in the expression "aqueous mediums containing living poliomyelitis virus" as used herein.

As stated previously a combination of ultraviolet irradiation and heat and/or heat plus formaldehyde is used in the production of the vaccines of the invention. The ultraviolet irradiation phase of the process is carried out by exposing a thin film or stream of the aqueous medium containing live poliomyelitis virus to ultraviolet light ranging in wave-length between 2000 and 3000 angstrom units and having an intensity sufficiently high to reduce the infectivity titer to an extremely low value in a short period of time. In order to insure the desired results, the average thickness of the film or stream which is exposed should in general be not greater than 100 microns and preferably 50 microns or less. A thickness somewhat greater than 100 microns can be employed but in this case greater exposures are required and the resulting loss of antigenicity is correspondingly greater. The source of ultraviolet light employed should emit a high proportion, preferably as high as 95%, of energy at a wave-length of 2537 angstrom units. Light sources emitting a somewhat lower proportion of energy at this desired wave-length are satisfactory but less efficient. For best results, a uniform light source emitting 95% energy at a wave-length of 2537 angstrom units and having a total power output of 10 to 25 watts is employed. The light source is conveniently employed at a distance of about one centimeter from the surface of the aqueous medium to be exposed. In terms of intensity of irradiation for ordinary requirements, the light source should be such as to provide from about 12,500 to 32,000 micro-watts per square centimeter of film surface area under exposure. When using an aqueous virus medium having an infectivity titer in the range of $10^{-5}$ to $10^{-8}$ as a starting material and the irradiation conditions indicated, an extremely high proportion of live organisms is killed within a matter of a few seconds of exposure. The length of exposure can be varied considerably but in general it is desirable to minimize the length of exposure in order to avoid any undue destruction of the inherent antigenicity of the virus. The preferred period of exposure is less than 10 seconds and for best results, about 0.5 to 2 seconds. For example, when employing ultraviolet light at a wave-length of 2537 angstrom units having an intensity of about 25,000 micro-watts per square centimeter, exposure of the live virus medium in a film having an average thickness of 50 microns for one second reduces the infectivity titer from $10^{-7}$ to about $10^{-1}$. In general, the conditions of exposure should be such as to reduce the infectivity titer to a value in the range of from $10^{-0.5}$ to $10^{-2.5}$. An apparatus which is preferred for the practice of the invention is a centrifugal filmer of the type described in United States Patent No. 2,725,482. This apparatus is made up of several parts; an external, slightly tapered, rotatable tube about 40 cm. in length with a 4° outward slope from the bottom closed end and a 9.5 cm. top inside diameter; an influent tube suspended in the center of the external tube which has its opening near the bottom of the external tube; six ultraviolet tubular lamps of approximately 30 cm. effective length suspended in the external tube surrounding the influent tube and so arranged that their external surface is within about 1 cm. from the internal wall of the external rotatable tube; and a suitable vessel surrounding the top of the external rotatable tube to catch and drain off the fluid which is forced out of the top of the rapidly rotating external tube during operation of the apparatus. The apparatus of course has suitable mechanical means for rapidly rotating the external tube. In operation the liquid to be irradiated introduced through the influent tube flows onto the bottom of the rapidly rotating external tube and is forced outward and upward in the form of a film past the ultraviolet lamps. The film of liquid is continuously pushed upward by the introduction of more material through the influent tube until it finally spills out into the vessel surrounding the top of the rotating external tube and is collected. Another apparatus which is suitable is described in United States Patent No. 2,588,716. It is understood that any comparable means for exposing thin films or streams to ultraviolet light for short periods of time will be suitable for the practice of the invention.

The temperature of the aqueous medium during irradiation is not critical. Unless external heat is applied, the medium will ordinarily be at room temperature or lower. However, best results are obtained when the irradiation is carried out on aqueous mediums having a temperature between about 30 and 42° C., preferably 35–40° C., and hence it is preferable to carry out the irradiation phase of the process after warming the medium to the aforementioned temperature.

The heating phase of the process, in the instances where it is employed, is carried out by heating or incubating the aqueous medium at a temperature of 30 to 50° C. for about two to twenty days. The preferred range of incubation temperature is about 35 to 40° C. and the preferred incubation time between three to ten days. In order to obtain the maximum killing effect, it is desirable to place the aqueous medium under incubation promptly, i.e. within two or three hours after it has been subjected to irradiation or to heat plus formaldehyde and then irradiation.

The heat plus formaldehyde phase of the process, in the instances where it is employed, is carried out by adding formaldehyde to the aqueous medium in a concentration in the range from about 1:2000 to 1:12,000, preferably in the range of 1:3000 to 1:5000, and heating the resultant mixture at a temperature between 30 and 42° C. The preferred heating temperature is between 35 and 40° C. and the preferred heating time is between two to six days. When applying this phase of the process to the original aqueous medium, the infectivity titer is reduced to the order of $10^{-1}$ or less. The presence of non-toxic amounts of formaldehyde in the final product is desirable to prevent possible deleterious enzymatic breakdown reactions and to prevent the formation of yeasts, molds, bacteria, etc. The formaldehyde is preferably added to the medium in the form of a sterile, aqueous solution, in the cold with thorough stirring.

In the foregoing description of how the ultraviolet irradiation, heat, and heat plus formaldehyde phases of the process are carried out, the description has, for simplicity, been limited to the treatment of the aqueous medium containing the living poliomyelitis virus. It should be understood however that the foregoing remarks apply with equal force and effect to aqueous mediums which have already been subjected to one or more of these killing treatments. For example, the remarks regarding the heat plus formaldehyde phase apply to aqueous mediums containing live poliomyelitis virus which have not been subjected to any killing treatment, to aqueous mediums which have already been subjected to the ultraviolet irradiation phase, to mediums which have been subjected to both the heat and ultraviolet irradiation phases, etc.

In carrying out the process it has been found that the best results are obtained if the original aqueous medium containing the live poliomyelitis virus is subjected either to a bacterial filtration, that is, Seitz filtration or ultra-fine sintered glass filtration, or to a pre-heating treatment just before carrying out the ultraviolet irradiation and/or the heat plus formaldehyde phases. If a preheating treatment is used the preferred temperature is in the range of 48 to 52° C. and the heating is carried out for a period of five minutes up to several hours. This preheating or filtration treatment apparently disperses the individual live virus particles which normally tend to aggregate and clump, thereby facilitating the subsequent exposure of the individual particles to a maximum intensity of irradiation or concentration of formaldehyde. The preheating treatment does not, so far as it has been possible to determine, lower the titer or potency of the vaccine and in fact it appears to ultimately increase the potency of the vaccine. Additionally, bacterial filtrations of the aforementioned type and/or preheating can advantageously be employed between the different phases of the process.

If desired, germicidal and/or stabilizing agents can be incorporated in the vaccine products of the invention. For example, benzethonium chloride may be added to the vaccine products to a concentration of about 1:20,000 to 1:50,000; preferably 1:40,000. A small amount of formaldehyde, that is, a concentration of 1:9,000 to 1:20,000, can, if desired, also be added to the vaccine products, which do not already contain formaldehyde.

The vaccine products of the invention contain no living poliomyelitis virus. They are also sterile in all other respects, that is, they contain no living bacteria, yeasts or molds. The products are capable of producing, upon administration to mammals susceptible to infection with live poliomyelitis virus, an immunity in the mammal against infection by the corresponding live virus. The term "administration" as used herein and in the appended claims means subcutaneous, intradermal or intramuscular injection. The vaccine products can be used either for the production of other poliomyelitis virus vaccine products such as alum or aluminum phosphate precipitated virus vaccine products or they can be administered to mammals for the purpose of inducing immunity. The products can, if desired, be administered without dilution but in most instances it is preferable to dilute them with a reasonable amount, that is, one to four volumes, of a suitable sterile aqueous medium. Some examples of suitable diluents are sterile Hank's solution, sterile saline and sterile distilled water.

The invention is illustrated by the following examples:

EXAMPLE 1

Cells for the cultivation of poliomyelitis virus are prepared by the method of Dulbecco, Journal of Experimental Medicine, 99, page 167 (1954). Briefly, this procedure consists in first preparing a suspension of monkey kidney epithelial cells (see Dulbecco, Proc. Nat. Acad. Sci. 38, page 747 (1952)) by treating macerated monkey kidney tissue from healthy Cynomolgus or Rhesus monkeys with trypsin to remove extraneous matter and release the individual cells. These cells are allowed to multiply on a suitable glass surface in any of a number of tissue culture mediums. The sheet of cultivated kidney cells thus produced is then inoculated with a seed culture of Type 1 (Mahoney strain) poliomyelitis virus and the mixture incubated at 36–37° C. until destruction of the cells is complete and large amounts of new virus have been released. The fluid containing the virus is harvested and passed through an ultra-fine fritted glass candle. The filtrate containing the living Type 1 poliomyelitis virus is assayed for virus content, bacterial sterility and strain purity. In the same manner a filtrate containing living Type 2 (MEF–1 strain) and a filtrate containing Type 3 (Saukett strain) are prepared, and the three filtrates are combined.

The combined filtrates containing Types 1, 2 and 3 of poliomyelitis virus and having an infectivity titer of $10^{-7.9}$ are passed through a centrifugal filmer at the rate of 600 ml. per minute under exposure to ultraviolet radiation at 20 watts output. The centrifugal filmer apparatus employed, of the type described in United States Patent No. 2,725,482 and produced by the Research Laboratory Division of General Motors Corporation, Detroit, Michigan, comprises a vertically disposed rotatable cylindrical cup chamber, means for rotating the chamber at a normal operating speed of 1700 r.p.m., and a tubular assembly of six uniformly spaced ultraviolet lamps positioned axially within the chamber. The inside diameter of the top rim of the chamber is approximately 9.5 cm. and the inner chamber wall slopes inwardly from the top at an angle of 4° from the vertical. The standing height of the inner chamber wall is approximately 40 cm. The outer surface of the lamp assembly is spaced at a distance of 1 cm. from the inner wall of the chamber and the effective intensity of ultraviolet radiation at the inner surface of the chamber is approximately 25,000 micro-watts per square centimeter. The average film thickness of the medium exposed to radiation is approximately 75 microns, and the over-all time of exposure is one second. The infectivity titer of the medium following exposure is approximately $10^{-1.8}$. An aliquot of the irradiated medium is then immediately incubated at 37° for ten days and the infectivity titer of the medium following incubation is zero, i.e., the medium is completely free of live poliomyelitis virus. The product so irradiated and incubated possesses a high order of antigenicity as indicated hereinafter.

The antigenicity of the products obtained above is determined in the following manner: Rhesus monkeys are inoculated with three 1 ml. doses of the vaccine at weekly intervals, the animals are bled one week after the end of the course of inoculation, a serum is prepared from the collected blood and the number of antibodies in the serum is determined. This determination is made by serially diluting the serum with saline and mixing the diluted aliquots so obtained with a standardized solution containing a known number of infectious units of the given type of poliomyelitis virus. For example, when analysing for Type 1 potency, one uses a standardized solution containing a known number of infectious units of Type 1 poliomyelitis virus; for analysis of Type 2 or Type 3 potency, one uses a standardized solution of infectious Type 2 or Type 3 virus. The end point of the titration is the dilution at which the serum contains sufficient antibodies to exactly neutralize, that is, combine with and render non-infectious, the known number of infectious units of the virus in the standardized solution. A number of monkeys are used in the analysis of the potency for each type of poliomyelitis virus. The results so obtained are placed in a form for convenient comparison and statistical evaluation by taking the log to the base 2 of the end point dilution for the serum for each monkey, averaging these figures and then taking the antiologarithm of the average so obtained. This antilog is called the geometric mean titer of the vaccines and it, of course, is different for each type of virus present in the vaccine. Since the geometric mean titer is dependent upon the potency of the standardized solution of the infectious poliomyelitis virus used in the test, it is necessary to specify the number of infectious units of the poliomyelitis virus present in the standardized solution to reflect the proper significance of the geometric mean titer. The method of calculating the geometric mean titer is set forth in detail in Amendment Number 2 to the Minimum Requirements of Poliomyelitis Vaccine, published May 20, 1954, by the United States Department of Health, Education and Welfare.

The results of the determination of the antigenicity of the vaccine product obtained by irradiation followed by incubation at 37° C. are given below in Table 1.

Table 1

| Sample Tested | Virus Type | Number of Monkeys Used | Geometric Mean Titer | No. of Infectious Units of Virus Neutralized [1] |
|---|---|---|---|---|
| Vaccine Product Produced by Irradiation and Incubation in Accordance with the Method of Example 1 | 1 | 5 | 7 | $10^{1.1}$ |
|  | 2 | 5 | 330 | $10^{1.4}$ |
|  | 3 | 5 | 16 | $10^{1.8}$ |

[1] Potency of standardized solution used in tests.

EXAMPLE 2

Filtrates of poliomyelitis virus culture fluids containing Types 1, 2 and 3 of poliomyelitis virus (infectivity titer: $10^{-6.33}$) are exposed to ultraviolet light for one second at the rate of 400 ml. per minute (film thickness: 50 microns) employing a centrifugal filmer apparatus as described in Example 1 under the same operating conditions. The infectivity titer of the medium following exposure is approximately $10^{-0.7}$. An aliquot of the medium is incubated at 45° C. for three days. The resulting incubated vaccine thus obtained is completely free from live virus and possesses a high degree of antigenicity. The following table shows a comparison, as regards antigenicity, of the above product with a vaccine product produced by the formaldehyde method from the same virus culture fluid. The formaldehyde was employed in a concentration of 1 to 4,000 and the mixture incubated at 37° C. for fourteen days.

*Table 2*

| Sample Tested | Virus Type | Number of Monkeys Used | Geometric Mean Titer | No. of Infectious Units of Virus Neutralized [1] |
|---|---|---|---|---|
| Vaccine Product Produced by Irradiation and Incubation for Three Days in Accordance with the Method of Example 3 | 1 | 3 | 10 | $10^{2.25}$ |
| | 2 | 3 | 1,378 | $10^{2.33}$ |
| | 3 | 3 | 475 | $10^{2.5}$ |
| Vaccine Product Produced by Standard Method Employing Formaldehyde in a Concentration of 1 to 4,000 at 37° C. for fourteen days | 1 | 3 | 7.5 | $10^{2.25}$ |
| | 2 | 3 | 8 | $10^{2.33}$ |
| | 3 | 3 | 8 | $10^{2.5}$ |

[1] Potency of standardized solution used in tests.

EXAMPLE 3

Sixty liters of an aqueous medium containing Types 1, 2 and 3 of live poliomyelitis virus (infectivity titer: $10^{-6.5}$) are prepared according to the method set forth in Example 1. One aliquot of the medium is exposed to ultraviolet light for one second at a flow-rate of 600 ml. per minute in the manner indicated in Example 1. The medium, which has an infectivity titer following irradiation of $10^{-1.84}$, is then incubated at 37° C. for three days.

Another aliquot is similarly irradiated, mixed with sterile, aqueous formaldehyde solution so as to obtain a formaldehyde concentration of 1:4000 and then incubated at 37° C. for three days.

Another aliquot is heated to 52° C. for about one hour, cooled to about 37 to 40° C., then similarly irradiated and incubated. Another aliquot is similarly heated, cooled, irradiated, mixed with sterile, aqueous formaldehyde solution so as to obtain a formaldehyde concentration of 1:4000 and incubated at 37° C. for three days.

The antigenicity of the vaccine products obtained, and of the untreated aqueous medium containing the live poliomyelitis virus, is determined by essentially the same method set forth in Example 1 employing guinea pigs instead of Rhesus monkeys as test animals. The only procedural differences in the two testing methods were that the guinea pigs were injected with 0.5 cc. portions of the vaccine instead of with 1 cc. portions and that the injections were made intradermally instead of intramuscularly. The results of the determination of the antigenicity are given in Table 3 below.

*Table 3*

| Sample Tested | Virus Type | Number of Guinea Pigs Used | Geometric Mean Titer | No. of Infectious Units of Virus Neutralized* |
|---|---|---|---|---|
| Vaccine Product Produced by Irradiation and Incubation. | 1 | 4 | 47 | $10^{1.35}$ |
| | 2 | 4 | 211 | $10^{1.44}$ |
| | 3 | 4 | 14 | $10^{1.35}$ |
| Vaccine Product Produced by Irradiation, and Formaldehyde plus Heat. | 1 | 3 | 40 | $10^{1.35}$ |
| | 2 | 3 | 158 | $10^{1.44}$ |
| | 3 | 3 | 22 | $10^{1.35}$ |
| Vaccine Product Produced by Pre-Heating, Irradiation and Incubation. | 1 | 4 | 99 | $10^{1.35}$ |
| | 2 | 4 | 223 | $10^{1.44}$ |
| | 3 | 4 | 33 | $10^{1.35}$ |
| Vaccine Product Produced by Pre-Heating. Irradiation and Formaldehyde plus Heat. | 1 | 4 | 62 | $10^{1.35}$ |
| | 2 | 4 | 168 | $10^{1.44}$ |
| | 3 | 4 | 16 | $10^{1.35}$ |
| Untreated Starting Material | 1 | 2 | 30 | $10^{1.35}$ |
| | 2 | 2 | 89 | $10^{1.44}$ |
| | 3 | 2 | 14 | $10^{1.35}$ |

[1] Potency of standardized solution used in tests.

EXAMPLE 4

30 liters of an aqueous medium containing live Type 1 poliomyelitis virus (infectivity titer $10^{-6.7}$) prepared as described in Example 1 is filtered through an ultra-fine sintered glass bacterial filter. Sufficient formalin is added to the cold solution with stirring to bring the formaldehyde concentration to 1:4000 and the mixture incubated at 37° C. for four days. The resulting suspension which has an infectivity titer of less than $10^{-1}$ is centrifuged in a cone-type centrifuge (De Laval Clarifier) at the rate of 600 ml. per minute and the clear effluent exposed to ultraviolet light using the centrifugal filmer apparatus described in Example 1. The flow rate used is 600 ml. per minute with incident output of ultraviolet energy of 16–18 watts. The film thickness during exposure is approximately 50 microns and the exposure time slightly less than one second. The micro-watts of incident ultraviolet energy are approximately 21,000 per square centimeter of film. If a flow rate of 150 or 300 ml. per minute is used, the energy should be reduced correspondingly. The resulting virus solution is again filtered through an ultra-fine sintered glass bacterial filter and a sample subjected to the standard safety tests. At this point the vaccine does not contain any live virus as indicated by a negative result in the safety test. However, the filtered suspension is then incubated at 37° C. for three days and another sample subjected to safety tests. Tests on this sample also showed the complete absence of living virus.

30 liters of an aqueous medium containing live Type 2 poliomyelitis virus (infectivity titer $10^{-7.7}$) were prepared as described in Example 1 and subjected to the same procedure as described above.

30 liters of an aqueous medium containing live Type 3 poliomyelitis virus (infectivity titer $10^{-6.5}$) were prepared as described in Example 1 and subjected to the same procedure as described above except that in the irradiation phase a flow rate of 600 ml. per minute was used along with an incident output energy of 14 to 16 watts.

The three vaccine suspensions prepared in the above described manner are mixed together and then diluted with three volumes of sterile Hank's solution. The vaccine product containing killed Types 1, 2 and 3 poliomyelitis virus is subjected to safety tests both before and after dilution. In both cases the safety tests indicated the complete absence of living virus. Sufficient benzethonium chloride is added in the form of a cold aqueous solution with efficient stirring to bring the final concentration to 1:40,000 and the resulting vaccine product is tested for potency with respect to each type of the poliomyelitis virus in monkeys using the standard United States National Institutes of Health test which involves comparison against a National Institutes of Health Reference Sera 2A. The results of this test are set forth in the following table.

Table 4

| Sample Tested | Virus Type | Number of Monkeys Used | Monkey Potency Factor [1] (Comparison Standard NIH Ref. Sera 2A) |
|---|---|---|---|
| Vaccine Product Produced by Irradiation and Formaldehyde plus Heat. | 1 | 12 | 1.0 |
| | 2 | 12 | 2.0 |
| | 3 | 12 | 2.4 |

[1] The monkey potency factor is calculated in each case by dividing the geometric mean titer of the monkey sera being tested for a particular virus type by the geometric mean titre of the National Institutes of Health Reference Sera 2A with respect to the same virus type. Minimum acceptable monkey factors for the various types of poliomyelitis virus are: Type 1—0.29; Type 2—0.25 and Type 3—0.16. (For further details see Minimum Requirements of National Institutes of Health, November 11, 1955.)

Following completion of the potency and safety tests the vaccine prepared above is filled into vials under sterile conditions and the vials sealed. A number of the vials prepared in this manner are selected at random and the contents subjected to the safety test. This safety test indicated the complete absence of living poliomyelitis virus. The vaccine product so produced is suitable for use in immunizing humans against infection by living Types 1, 2 and 3 poliomyelitis virus. If desired, the vaccine product can also be used in the production of other vaccine products, e.g. alum or aluminum phosphate precipitated poliomyelitis vaccines.

EXAMPLE 5

30 liters of an aqueous medium containing live Type 1 poliomyelitis virus (infectivity titer $10^{-6.7}$) prepared as described in Example 1 is filtered through an ultra-fine sintered glass bacterial filter. Sufficient formalin is added to the cold solution with stirring to bring the formaldehyde concentration to 1:4000 and the mixture incubated at 37° C. for four days. The resulting suspension which has an infectivity titer of less than $10^{-1}$ is centrifuged in a cone-type centrifuge (De Laval Clarifier) at the rate of 600 ml. per minute and the clear effluent exposed to ultraviolet light using the centrifuged filmer apparatus described in Example 1. The ultraviolet light source has an incident energy output of 20 watts and a flow rate of 600 ml. per minute is used. The film thickness during exposure is approximately 50 microns and the exposure time slightly less than one second. The microwatts of incident ultraviolet energy are approximately 21,000 per square centimeter of film. 600 ml. of the vaccine product so obtained is subjected to the standard safety tests and found to contain no living poliomyelitis virus.

30 liters of an aqueous medium containing live Type 2 poliomyelitis virus are prepared as described in Example 1 and treated as described above. Safety tests on the resulting vaccine product demonstrate that it contains no living poliomyelitis virus.

30 liters of an aqueous medium containing live Type 3 poliomyelitis virus are prepared as described in Example 1 and treated as described above. Safety tests on the resulting vaccine product demonstrate that it contains no living poliomyelitis virus.

The three vaccine products prepared as described above are mixed together and after removal of a 900 ml. sample for safety testing, the mixture is diluted with three volumes of sterile Hank's solution. A 900 ml. sample of the diluted vaccine was subjected to a safety test along with the undiluted sample and both were found to be completely free from live poliomyelitis virus. Sufficient benzethonium chloride is added to the vaccine product to bring the concentration to 1:40,000. The resultant product is tested for potency in monkeys using the procedure referred to in Example 4. The results of the test are shown in Table 5.

*Table 5*

| Sample Tested | Virus Type | Number of Monkeys Used | Monkey Potency Factor (Comparison Standard NIH Ref. Sera 2A) |
|---|---|---|---|
| Vaccine Product Produced by Irradiation and Formaldehyde plus Heat. | 1 | 12 | 6.7 |
| | 2 | 12 | 4.5 |
| | 3 | 12 | 3.6 |

Following completion of the potency and safety tests the vaccine product is filled into vials under sterile conditions and the vials sealed. The product so produced is suitable for use in immunizing humans against infection by living Types 1, 2 and 3 poliomyelitis virus.

While in the foregoing description certain embodiments of the invention have been set forth in detail, it will be understood by those skilled in the art that considerable variation can be made in such detail without departing from the spirit of the invention.

This application is a continuation-in-part of my copending application Serial Number 530,879, filed August 26, 1955 (now abandoned).

I claim:

1. Process for producing a poliomyelitis virus vaccine which comprises exposing a solid-free aqueous medium in which poliomyelitis virus is capable of existing but incapable of growth, which contains live poliomyelitis virus and has an infectivity titre of at least $10^{-5}$, to exposure in a film not greater than 100 microns in thickness for not more than two seconds to a source of ultraviolet light emitting a high proportion of its energy at a wave length of 2537 angstrom units and having an intensity between 12,500 and 32,000 micro-watts per square centimeter of film surface exposed and then incubating the exposed solution at a temperature of 35 to 40° C. for a time sufficient to reduce the infectivity titre of the solution to zero.

2. Process according to claim 1 wherein the aqueous medium is heated to 48 to 52° C. and then cooled to 35 to 40° C. prior to irradiation.

3. Process for producing a poliomyelitis virus vaccine which comprises exposing a solid-free aqueous medium in which poliomyelitis virus is capable of existing but incapable of growth, which contains live poliomyelitis virus and has an infectivity titre of at least $10^{-5}$, to exposure in a film not greater than 100 mircons in thickness for not more than two seconds to a source of ultraviolet light emitting a high proportion of its energy at a wave length of 2537 Angstrom units and having an intensity between 12,500 and 32,000 micro-watts per square centimeter of film surface exposed, adding sufficient formaldehyde to the exposed solution to produce a formaldehyde concentration in the range from 1:2000 to 1:12,000 and incubating the resulting solution at a temperature between 35 and 40° C. for a time sufficient to reduce the infectivity titre of the solution to zero.

4. Process according to claim 3 wherein the aqueous medium is heated to 48 to 52° C. and then cooled to 35 to 40° C. prior to irradiation.

5. Process for producing a poliomyelitis virus vaccine which comprises adding sufficient formaldehyde to a solid-free aqueous medium in which poliomyelitis virus is capable of existing but incapable of growth, which contains live poliomyelitis virus and has an infectivity titre of at least $10^{-5}$, to produce a formaldehyde concentration in the range of 1:2000 to 1:12,000, incubating the resulting solution for a period of two to six days at a temperature between 35 and 40° C. and then exposing the incubated solution in a film not greater than 100 microns in thickness for not more than two seconds to a source of ultraviolet light emitting a high proportion of its energy at a wave length of 2537 Angstrom units and having an intensity between 12,500 and 32,000 micro-watts per square centimeter of film surface exposed.

6. Process according to claim 5 wherein the process is carried out individually on aqueous media containing living Types 1, 2 and 3 poliomyelitis virus and the individual vaccines so produced are subsequently mixed with one another thereby producing a poliomyelitis virus vaccine containing killed Types 1, 2 and 3 poliomyelitis virus.

7. Process according to claim 5 wherein the aqueous medium is subjected to bacterial filtration prior to incubation with formaldehyde and prior to exposure to ultraviolet irradiation.

8. Process for producing a poliomyelitis virus vaccine which comprises adding sufficient formaldehyde to a solid-free aqueous medium in which poliomyelitis virus is capable of existing but incapable of growth, which contains live poliomyelitis virus and has an infectivity titre of at least $10^{-5}$, to produce a formaldehyde concentration in the range of 1:2000 to 1:12,000, incubating the resulting solution for a period of two to six days at a temperature between 35 and 40° C., exposing the incubated solution in a film not greater than 100 microns in thickness for not more than two seconds to a source of ultraviolet light emitting a high proportion of its energy at a wave length of 2537 Angstrom units and having an intensity between 12,500 and 32,000 micro-watts per square centimeter of film surface exposed and then incubating the exposed solution at a temperature between 35 and 40° C., for three to ten days.

9. Process according to claim 8 wherein the process is carried out individually on aqueous media containing living Types 1, 2 and 3 poliomyelitis virus and the individual vaccines so produced are subsequently mixed with one another thereby producing a poliomyelitis virus vaccine containing killed Types 1, 2 and 3 poliomyelitis virus.

10. Process according to claim 8 wherein the aqueous medium is subjected to bacterial filtration prior to incubation with formaldehyde, prior to exposure to ultraviolet irradiation and prior to incubation at an elevated temperature.

11. Process for producing poliomyelitis virus vaccine which comprises exposing an aqueous medium containing live poliomyelitis virus in a flowing film not greater than 100 microns in thickness for not more than two seconds to a source of ultraviolet light of wave length in the range of 2000 to 3000 Angstrom units and an intensity between 12,500 and 32,000 micro-watts per square centimeter of film surface exposed, adding sufficient formaldehyde to the solution to produce a formaldehyde concentration of 1:2000 and 1:12,000 and then incubating the solution at a temperature between 30 to 42° C. for a time sufficient to completely kill said virus without causing substantial reduction in the inherent antigenicity of said virus; said aqueous medium being a solid-free tissue culture fluid infected with the live poliomyelitis virus and having an infectivity titre of at least $10^{-5}$.

12. Process for producing a poliomyelitis virus vaccine which comprises adding sufficient formaldehyde to an aqueous medium containing live poliomyelitis virus to produce a solution having a formaldehyde concentration of 1:2000 to 1:12,000, incubating the solution at a temperature between 30 to 42° C. for a time sufficient to lower the infectivity titre of the solution to about $10^{-1}$ and then exposing incubated solution in a flowing film not greater than 100 microns in thickness for not more than two seconds to a source of ultraviolet light of wave length in the range of 2000 to 3000 Angstrom units and an intensity of between 12,500 and 32,000 micro-watts per square centimeter of film surface exposed; said aqueous medium being a solid-free fluid harvested from tissue cultures infected with the live poliomyelitis virus and having an infectivity titre of at least $10^{-5}$.

13. Process for producing a poliomyelitis virus vaccine which comprises adding sufficient formaldehyde to an aqueous medium containing live poliomyelitis virus to produce a solution having a formaldehyde concentration of 1:2000 to 1:12,000, incubating the solution at a temperature between 30 and 42° C. for at least two days thereby substantially reducing the infectivity titre of said solution, exposing the incubated solution in a flowing film not greater than 100 microns in thickness for not more than two seconds to a source of ultraviolet light of wave length in the range of 2000 to 3000 Angstrom units and an intensity between 12,500 to 32,000 micro-watts per square centimeter of film surface exposed, and then heating said exposed solution at a temperature of 30 to 50° C. for a time sufficient to provide complete killing of said virus without causing substantial reduction of the inherent antigenicity of said virus; said aqueous medium being a solid-free fluid harvested from tissue cultures infected with the live poliomyelitis virus and having an infectivity titre of at least $10^{-5}$.

References Cited in the file of this patent

UNITED STATES PATENTS 2,421,382    Levinson et al. _____ June 3, 1947

FOREIGN PATENTS 14,972    Great Britain _____ 1914

OTHER REFERENCES

Science News Letter, July 1, 1944, page 3.
Kaplan: Annual Review of Microbiology, vol. 7, 1952, page 59.
J. Bact., vol. 61, 1951, pages 243–244, 389–394.
Ledinko et al.: Biol. Abst., April 1955, vol. 29, No. 4, page 896, paragraph 9061.